Nov. 28, 1967   D. J. MURPHY, JR   3,354,622
UNIT FILTER ASSEMBLY
Filed Aug. 2, 1965
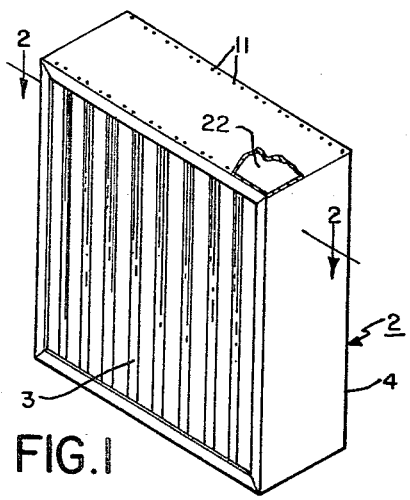
FIG.1
FIG.2
FIG.6
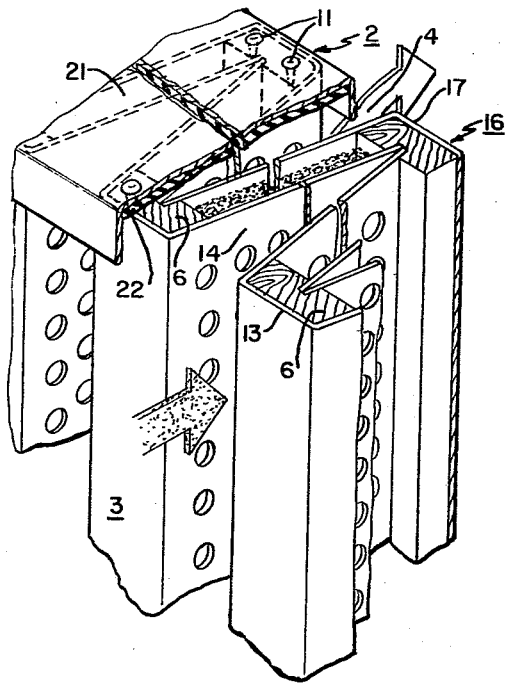
FIG.3
FIG.5
FIG.4
INVENTOR.
DAVID J. MURPHY, JR.
BY
ATTORNEY

United States Patent Office 3,354,622
Patented Nov. 28, 1967

3,354,622
UNIT FILTER ASSEMBLY
David J. Murphy, Jr., Louisville, Ky., assignor to American Air Filter Company, Inc., Louisville, Ky., a corporation of Delaware
Filed Aug. 2, 1965, Ser. No. 476,289
10 Claims. (Cl. 55—484)

ABSTRACT OF THE DISCLOSURE

An improved unit particulate filter assembly including a flow-through frame having first and second sets of perforated plenum-forming members of V-shaped cross sections with the flanks thereof interrelated in overlap fashion to form plenum-forming chambers therebetween which receive fluid treating particulate materials.

---

The present invention relates to unit filter assemblies and more particularly to an improved unit filter assembly which provides a plurality of filter banks across a gas stream to be treated.

In accordance with the present invention a novel unit filter assembly is provided which is simple and straightforward in construction, requiring a minimum of structural parts and requiring a minimum of tooling and assembly steps. In addition, the present invention provides a sturdy filter construction that can be easily manipulated for installation and that can be readily adapted to use with particulate material of various types.

Various other features of the present invention will become obvious to one skilled in the art upon reading the disclosure set forth hereinafter.

More particularly, the present invention provides a unit filter assembly comprising: an open-ended frame member having an upstream dirty gas inlet and a downstream clean gas outlet; a first set of spaced longitudinally-extending plenum-forming members of substantially U-shaped cross section disposed within the frame member, each having its base portion extending transversely across the dirty gas inlet and having perforated flank portions extending from the dirty gas inlet toward the clean gas outlet; a second set of spaced longitudinally-extending plenum-forming members of substantially U-shaped cross section disposed within the frame member, each having its base portion extending transversely across the clean gas outlet and having perforated flank portions extending from the clean gas outlet toward the dirty gas inlet, the flank portions of the first and second sets of U-shaped plenum-forming members being spaced from and cooperatively disposed with respect to the base portions of the sets to form flow through plenum chambers; and filter media material disposed within the perforated plenum chamber in sufficient quantities to substantially fill the same. In addition, the present invention provides a novel arrangement of support bars for cooperating with and supporting the plenum-forming members within the housing. Further, the present invention provides a novel sealing gasket arrangement cooperatively positioned between the edges of the plenum-forming members and the walls of the housing.

It is to be understood that various changes can be made in the arrangement, form, and construction of the apparatus disclosed herein without departing from the scope or spirit of the present invention.

Referring to the drawing which discloses one advantageous embodiment of the present invention:

FIGURE 1 is an isometric view of the novel unit filter assembly;

FIGURE 2 is an enlarged cross-sectional view taken in a plane passing through line 2—2 of FIGURE 1, disclosing a portion of the assembly of FIGURE 1;

FIGURE 3 is an enlarged, isometric partially broken-away view of a portion of the assembly of FIGURE 2;

FIGURE 4 is an isometric view of a portion of a U-shaped plenum-forming member utilized in the construction of the assembly of FIGURES 1 to 3;

FIGURE 5 is an isometric view of a portion of a support bar member utilized in the construction of the assembly of FIGURES 1 to 3; and FIGURE 6 is an isometric view of a perforated end plate member utilized with one of the sets of plenum-forming members in the construction of the assembly of FIGURES 1 to 3.

As can be seen in FIGURE 1 of the drawing, the inventive assembly includes open-ended rectangular frame member 2 having upstream dirty gas inlet 3 and downstream clean gas outlet 4. Frame member 2 can be formed from any one of a number of suitable materials such as wood or metal, and although advantageously shown in rectangular form, can be of different geometric configurations.

As can be seen more readily in FIGURES 2 and 3 of the drawing, frame member 2 has disposed therein a first set of spaced, parallel support bars 6. Support bars 6 which also can be formed from any one of a number of suitable structural materials, advantageously are fabricated from wood and are fastened at their ends to opposite walls of frame member 2 to extend transversely across dirty gas inlet 3. As can be seen in FIGURE 5 of the drawings, each of support bars 6 of the first set of support bars has a slot 7 extending longitudinally along the downstream face thereof. A second set of spaced parallel support bars 8 are provided within frame 2 to be fastened at their ends to the opposite walls of the frame so as to extend transversely across the clean gas outlet 4 in offset relationship to the first set of support bars 6. In like fashion, each of support bars 8 of the second set is provided with slot 9 which extends longitudinally along the upstream face thereof. It is to be understood that the ends of support bars 6 and 8 can be fastened to the opposite walls of frame 2 by any one of a number of means. Advantageously, rivets 11 can be passed through the walls of the frame to engage with the ends of the support bars.

To form the plenum chambers in frame 2, a first set of longitudinally-extending plenum-forming members 12 (FIGURE 4) of substantially U-shaped cross section is provided. These plenum-forming members advantageously can be made of a suitable rigid and flexible material and advantageously, thin, perforated metal sheets have been found suitable for this purpose. Each plenum-forming member of the first set has its base portion 13 co-extensive with and surrounding one of the support bars 6 of the first set, the plenum-forming members of the first set having perforated flank portions 14 extending from the dirty gas inlet toward the clean gas outlet 4 in diverging fashion with the ends thereof engaging in the slots 9 along the upstream faces of the second set of support bars 8. A second set 16 of longitudinally-extending plenum-forming members of substantially U-shaped cross section and of substantially the same configuration as the first set as well as of the same material is provided. Each plenum-forming member of the second set has its base portion 17 coextensive with and surrounding one of the second set of support bars 8, the second set of plenum-forming members having perforated flank portions 18 extending from the clean gas outlet toward the dirty gas inlet in diverging fashion parallel to and in spaced relationship with the flanks 14 of the first plenum forming members, and with the ends of the flanks 18 engaging in the slots 7 along the downstream faces of the first set of support bars 6. It is to be noted that in the embodiment disclosed, there is one more plenum-forming member 12 of the first set than there is a plenum-forming member 16 of the second set. Accordingly, perforated end flank plates 19 extending parallel to and spaced from the perforated end flanks of the first set are provided, these end flanks including a channel-shaped end portion abutting and engaging the split support bars 20 that are mounted to the end of the frame in a manner similar to the mounting of downstream support bars 8. With the arrangement aforedescribed, it can be seen that a plurality of perforated plenum chambers 21 are formed which extend in V-shaped pleat bank form across the open-ended frame members. It is to be noted that the opposite walls of the frame members which receive the support bars are provided with a sheet of soft, compressible and pliable sealing gasket material 22 such as rubber which extends along the inner face thereof to receive the edges of the longitudinally-extending plenum-forming flanks. Disposed within plenums 21 is a particulate carbon filter media 23 which is poured into the plenums once they are formed in sufficient quantities to substantially fill the same. In this connection, it is to be noted that the sealing gasket 23 can be of sufficient thickness and sufficient compressibility to yieldingly engage against and insure a certain amount of compressibility of the particulate media disposed in the plenum chambers 21 to accommodate for particulate settling.

Thus, in accordance with the present invention, a filter assembly arrangement is provided which is straightforward, economical and simple in its construction, requiring a minimum of structural parts and permitting ready manipulation for installation and for ready renewability of particulate media.

The invention claimed is:

1. A unit filter assembly comprising: an open-ended frame member having an upstream dirty gas inlet and a downstream clean gas outlet; a first set of spaced parallel support bars extending transversely across said dirty gas inlet; a second set of spaced parallel support bars extending transversely across said clean gas outlet in offset relation to said first set of support bars; a first set of longitudinally-extending plenum-forming members of substantially U-shaped cross section, each having its base portion co-extensive with and surrounding one of said first set of support bars, said first set of plenum-forming members having perforated flank portions extending from said dirty gas inlet toward said clean gas outlet with the ends thereof abutting the faces of said second set of support bars; a second set of longitudinally-extending plenum-forming members of substantially U-shaped cross section, each having its base portion co-extensive with and surrounding one of said second set of support bars, said second set of plenum-forming members having perforated flank portions extending from said clean gas outlet toward said dirty gas inlet with the ends thereof abutting the faces of said first set of support bars, the flank portions of said first and second set of U-shaped plenum-forming members being spaced from each other to form flow through plenum chambers, therebetween, the ends of said plenum chambers being determined by said support bars; and filter media material disposed within said flow through plenum chambers in sufficient quantities to substantially fill the same.

2. The apparatus of claim 1, said support bars having opposed flank receiving slots into which the ends of said perforated flanks extend.

3. The apparatus of claim 1, said flanks of said first set of plenum-forming members extending parallel to said flanks of said second set of plenum-forming members.

4. The apparatus of claim 1, said flanks of said first and second sets of plenum-forming members diverging outwardly to form a substantially V-shaped pleat bank extending across said open-ended frame members.

5. The apparatus of claim 1, and a soft, compressible sealing gasket extending along the inner faces of said open-ended frame member to receive in sealing engagement therewith the edges of said longitudinally-extending plenum-forming flanks and to yieldingly engage against the filter media material disposed within said flow through plenum chambers.

6. A unit filter assembly comprising: an open-ended rectangular frame member having an upstream dirty gas inlet and a downstream clean gas outlet; a first set of spaced parallel support bars fastened at their ends to opposite walls of said frame member to extend transversely across said dirty gas inlet, each of said support bars of said first set having a slot extending longitudinally along the downstream face thereof; a second set of spaced parallel support bars fastened at their ends to said opposite walls of said frame member to extend transversely across said clean gas outlet in offset relation to said first set of support bars, each of said support bars of said second set having a slot extending longitudinally along the upstream face thereof; a first set of longitudinally-extending plenum-forming members of substantially U-shaped cross section, each having its base portion co-extensive with and surrounding one of said first set of support bars, said first set of plenum-forming members having perforated flank portions extending from said dirty gas inlet toward said clean gas outlet in diverging fashion with the ends thereof engaging in the slots along the upstream faces of said second set of support bars; a second set of longitudinally-extending plenum-forming members of substantially U-shaped cross section, each having its base portion co-extensive with and surrounding one of said second set of support bars, said second set of plenum-forming members having perforated flank portions extending from said clean gas outlet toward said dirty gas inlet in diverging fashion parallel to and in spaced relationship with said flanks of said first plenum-forming members with the ends of said flanks of said second plenum-forming members engaging in the slots along the downstream faces of said first set of support bars, said first and second sets of plenum-forming members differing in number by one with the set of lesser number including perforated end flank plates extending parallel to and spaced from the perforated end flanks of said set of greater number to form flow through plenum chambers therebetween extending in V-shaped pleat bank form across said open-ended frame member; said opposite walls of said frame member having a soft, compressible sealing gasket extending along the inner faces thereof to receive the edges of said longitudinally-extending plenum-forming flanks in sealing engagement therewith; and particulate carbon filter media disposed within said flow through plenum chambers in sufficient quantities to substantially fill the same with said sealing gasket yieldingly engaging against the end walls of said media within said chambers.

7. A unit filter assembly comprising: an open-ended frame member having first and second sets of opposed walls and having an upstream dirty gas inlet and a downstream clean gas outlet; a first set of individual spaced longitudinally-extending integral one-piece plenum-forming members of substantially U-shaped cross section disposed wtihin said frame member to extend between said first set of opposed walls, each having its base portion extending transversely across said dirty gas inlet between said second set of opposed walls and having perforated flank portions extending from said dirty gas inlet to said clean gas outlet and between said second set of opposed walls; a second set of individual spaced longitudinally-extending integral one-piece plenum-forming members of substantially U-shaped cross section disposed within said frame member to extend between said first set of opposed walls, each having its base portion extending transversely across said clean gas outlet between said second set of opposed walls and having perforated flank portions extending from said clean gas outlet to said dirty gas inlet and between said second set of opposed walls, the flank portions of said first and second sets of U-shaped plenum-forming members being spaced from each other with each of the flank portions of one set extending intermediate the flank portions of a U-shaped plenum-forming member of the other set defining with said base portions of said sets individual flow through plenum chambers therebetween; and filter media material disposed within said flow through plenum chambers in sufficient quantities to substantially fill the same.

8. The apparatus of claim 7, said flanks of said first set of plenum-forming members extending parallel to said flanks of said second set of plenum-forming members.

9. The apparatus of claim 7, said flanks of said first and second sets of plenum-forming members diverging outwardly to form a substantially V-shaped pleat bank extending across said open-ended frame member.

10. The apparatus of claim 7, and a soft, compressible sealing gasket extending along the inner faces of said open-ended frame member to receive in sealing engagement therewith the edges of said longitudinally-extending plenum-forming flanks and to yieldingly engage against the filter media material disposed within said flow through plenum chambers.

References Cited
UNITED STATES PATENTS

| | | | |
|---|---|---|---|
| 2,053,159 | 9/1936 | Miller | 55—390 |
| 2,579,477 | 12/1951 | Dauphinee | 55—387 |
| 2,723,731 | 11/1955 | Schaaf | 55 |
| 3,144,315 | 8/1964 | Hunn | 55—500 |

HARRY B. THORNTON, *Primary Examiner.*

B. NOZICK, *Assistant Examiner.*